J. H. CURLEY.
RESILIENT TREAD AND REINFORCING SPRING FOR SHOES.
APPLICATION FILED JULY 24, 1909.
952,609.
Patented Mar. 22, 1910.
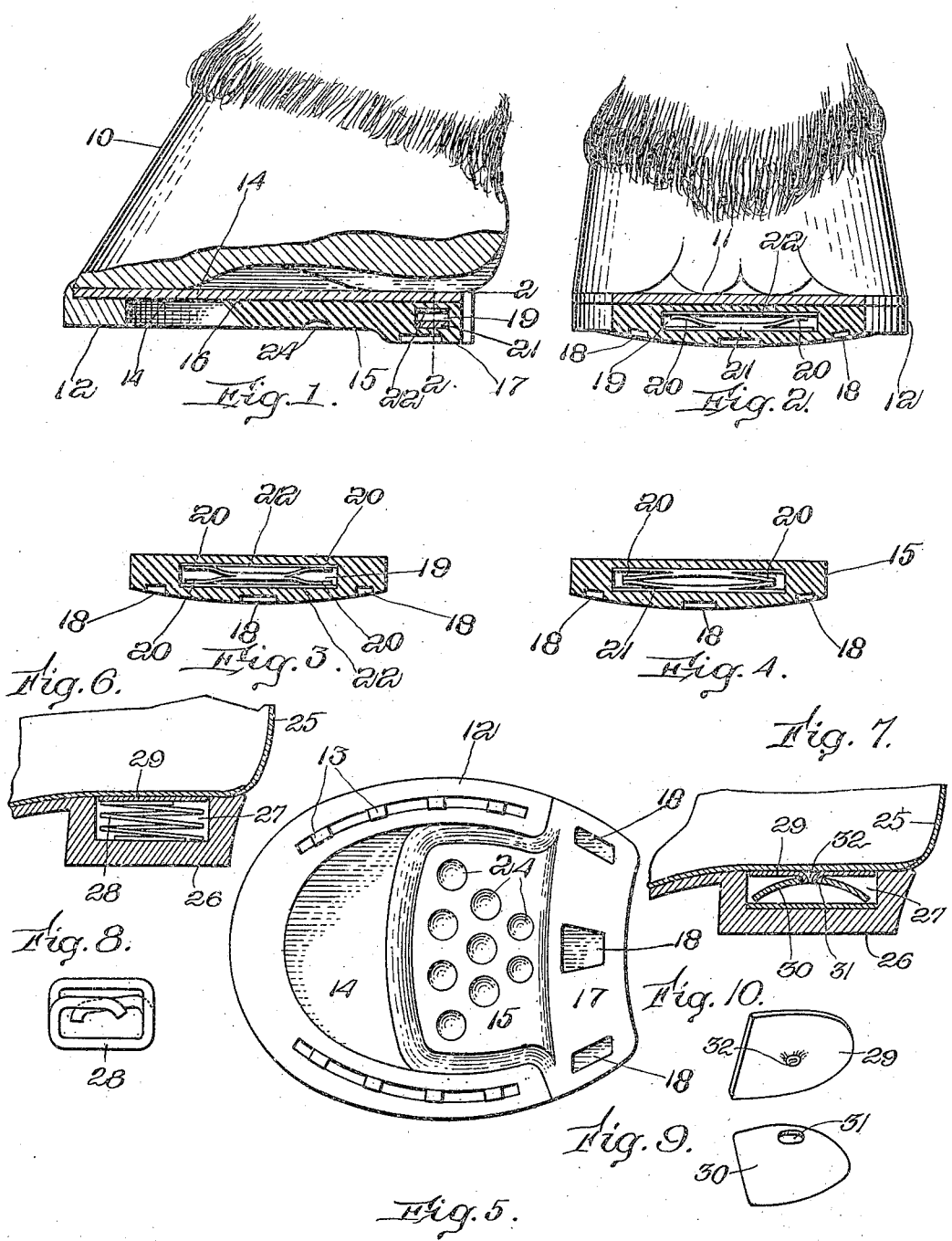
Witnesses:
Inventor:
John H. Curley

UNITED STATES PATENT OFFICE.

JOHN H. CURLEY, OF BROCKTON, MASSACHUSETTS.

RESILIENT TREAD AND REINFORCING-SPRING FOR SHOES.

952,609.  Specification of Letters Patent.  Patented Mar. 22, 1910.

Application filed July 24, 1909. Serial No. 509,308.

*To all whom it may concern:*

Be it known that I, JOHN H. CURLEY, of Brockton, in the county of Plymouth and State of Massachusetts, have invented certain new and useful Improvements in Resilient Hoof-Pads, of which the following is a specification.

This invention relates to horseshoe pads, and its objects are, first, to distribute the pressure to the exclusion of the frog of a hoof, and, secondly, to increase the resilience of the pad.

The type of pad to which this invention relates is that in which a cross bar of resilient material is provided at the rear to extend transversely under the heel and frog of the hoof, and to present a tread surface supplementing that of the shoe. The tread surface of the cross bar lies below that of the shoe and the bar is therefore subject to compression when supporting a weight. If, when a pad having a solid resilient cross bar is in use, the intermediate portion of the bar rests upon a small or narrow object, the said portion is compressed against the frog which is thereby made the recipient of the greater proportion of all the pressure upon the hoof.

The present invention provides a cross bar by which the frog is protected against upward pressure, no matter which part of the tread surface is compressed.

The first step in carrying out the invention is to form the cross bar with a central chamber directly below the frog. The bar is thus marked by the absence of intermediate substance which would, if present, transmit pressure to the frog. The absence of the intermediate substance, however, robs the bar of its requisite strength, but this deficiency is filled by providing additional resilient means in the chamber. The strength and resilience of the bar are thus restored, but instead of being disposed equally with relation to all parts of the bar, they are so disposed as to divert pressure from the frog and distribute it to the ends of the bar on either side of the frog. Thus the heel portions, and not the frog, of the hoof are made the recipients of the pressure from the cross bar. The bar may, moreover, have a convex tread surface whose central portion is adapted to strike first, but in any event, the pressure is so diverted as to entirely avoid the frog.

Of the accompanying drawings, forming a part of this specification,—Figure 1 illustrates a longitudinal section of a horseshoe and pad showing one embodiment of the invention. Fig. 2 is a section on line 2—2 of Fig. 1. Fig. 3 is a similar section of the pad alone, including a different form of reinforcing spring. Fig. 4 is another similar section of the pad showing still another form of spring. Fig. 5 is an inverted plan view of the pad with the shoe. Fig. 6 is a longitudinal section of the heel portion of a shoe for human beings, showing another embodiment of the invention. Fig. 7 shows a modification of the form of Fig. 6. Figs. 8 and 9 show different forms of springs. Fig. 10 shows a wear plate to be used with the spring shown by Fig. 7.

The same reference characters indicate the same parts wherever they occur.

On the drawings,—10 indicates a hoof of which the frog is indicated at 11.

12 indicates a metal shoe of usual form which may be attached to the hoof in the usual way by nails 13. The pad 14, composed preferably of leather is interposed between the hoof and the shoe.

15 indicates a resilient pad composed preferably of rubber, said resilient pad being attached to the leather pad 14 by a layer of cement 16, or other appropriate means. The pad 15 covers only the rear portion of the pad 14, and is intended to protect the heel of the hoof against shock. It is preferably provided with a slightly thicker portion 17 extending transversely across the rear in the form of a bar. The tread surface of the bar 17 is preferably convex, as indicated by Figs. 2, 3, and 4, and may be formed with a plurality of suction cups 18.

The bar 17 lies directly beneath the frog 11, and in carrying out the present invention, the intermediate portion thereof is provided with a chamber containing a reinforcing spring by which pressure is diverted from the frog.

Referring now to Fig. 2, 20, 20 indicate a pair of spring fingers formed upon or otherwise attached to a plate 21 embedded in the chamber 19. The spring fingers are here shown as extending upwardly and laterally in opposite directions. A wear plate 22 may be interposed between the fingers 20 and the upper wall of the chamber 19 in order to protect the pad against being worn away by the spring fingers. It will be observed that the points of contact between the spring fingers and the plate 22 are on either side of the frog 11, and by reason of this arrangement, the spring fingers are adapted to distribute the pressure on either side of the frog instead of directing it toward the frog.

The form of spring shown by Fig. 3 includes four spring fingers 20 formed integrally or rigidly attached in the center. In this form, the free ends of the fingers are separated and the upper and lower walls of the chamber 19 are protected by wear plates 22 interposed between the walls and the spring fingers.

The arrangement shown by Fig. 4 includes two spring members, such as that shown in Fig. 2. The spring members according to this arrangement are placed so that their fingers 20 extend toward each other and engage in the middle of the chamber 19. The flat plates 21 on which the spring fingers are formed or attached lie against the upper and lower walls of the chamber, and serve instead of the separate wear plates 22 shown in Figs. 2 and 3.

That portion of the resilient pad 15 which lies between the rear bar 17 and the toe of the shoe may be provided with additional suction cups 24.

The reinforcing spring, by distributing pressure from the center to the sides of the pad, avoids jarring the navicular bone which is directly above the frog, thus rendering the action of the leg considerably easier. The action is quickened by reason of the resiliency of the pad, and for this reason, the fore feet of the horse may leave the ground quicker and thereby avoid what is termed forging, that is, overreaching and interference by the hind feet. After a short duration of use, the sides of the heel are spread because of the manner in which the pressure is distributed.

Referring to Figs. 6 and 7, in which 25 indicates the heel portion of a shoe for human beings, 26 is the heel composed of resilient material, such as rubber. The heel is formed with a chamber 27 adapted to receive a reinforcing spring. The spring 28 shown by Figs. 6 and 8, is approximately helical in form. Wear plates 29 may be interposed between the spring and the walls of the chamber. The spring 30 shown by Figs. 7 and 9 is discoidal in form, and is dished. It may be provided with a central aperture 31 adapted to receive a knob 32 formed upon one of the wear plates 29. The interlocking of the knob with the spring is adapted to hold the spring against lateral displacement, and so prevent its edges from unduly wearing the side walls of the chamber.

The essential feature of the invention in any of its forms is the body of resilient material with the central chamber and reinforcing spring inclosed therein. A solid body of rubber, although it is adapted to absorb jarring, is not as resilient as when it is formed with a chamber and provided with a spring in the chamber. The provision of the chamber removes the central portion of the body of resilient material thereby giving greater resiliency to the remaining portion of the body, and the provision of the spring, while permitting greater compression of the resilient body, nevertheless compensates for the removal of resilient material from the center of the body.

I claim:

1. A hoof pad comprising a cross bar of resilient material at the heel, said cross bar being formed with a central chamber, and resilient means in said chamber engaging the top wall of the chamber near the ends of said cross bar, said means being otherwise disengaged from said top wall.

2. A hoof pad comprising a cross bar of resilient material at the heel, said cross bar being formed with a central chamber, and a resilient means arranged in said chamber and including upwardly extending members engaging the top wall of the chamber near the ends of said cross bar, said means being otherwise disengaged from said top wall between the points of engagement of said upwardly extending members.

3. A hoof pad comprising a cross bar of compressible material at the heel, said cross bar being hollow, and resilient means arranged within said cross bar, and including a leaf spring engaging the top wall of the chamber formed by said cross bar.

4. The combination with a horseshoe of a pad covering the upper surface of the shoe, said pad including a bar of resilient material extending transversely from one heel-extremity of the shoe to the other, said bar having a convex tread surface, and a central chamber, and resilient means arranged in said chamber and engaging the upper and lower wall thereof.

In testimony whereof I have affixed my signature, in presence of two witnesses.

JOHN H. CURLEY.

Witnesses:
ARTHUR H. BROWN,
P. W. PEZZETTI.